Figure 1:
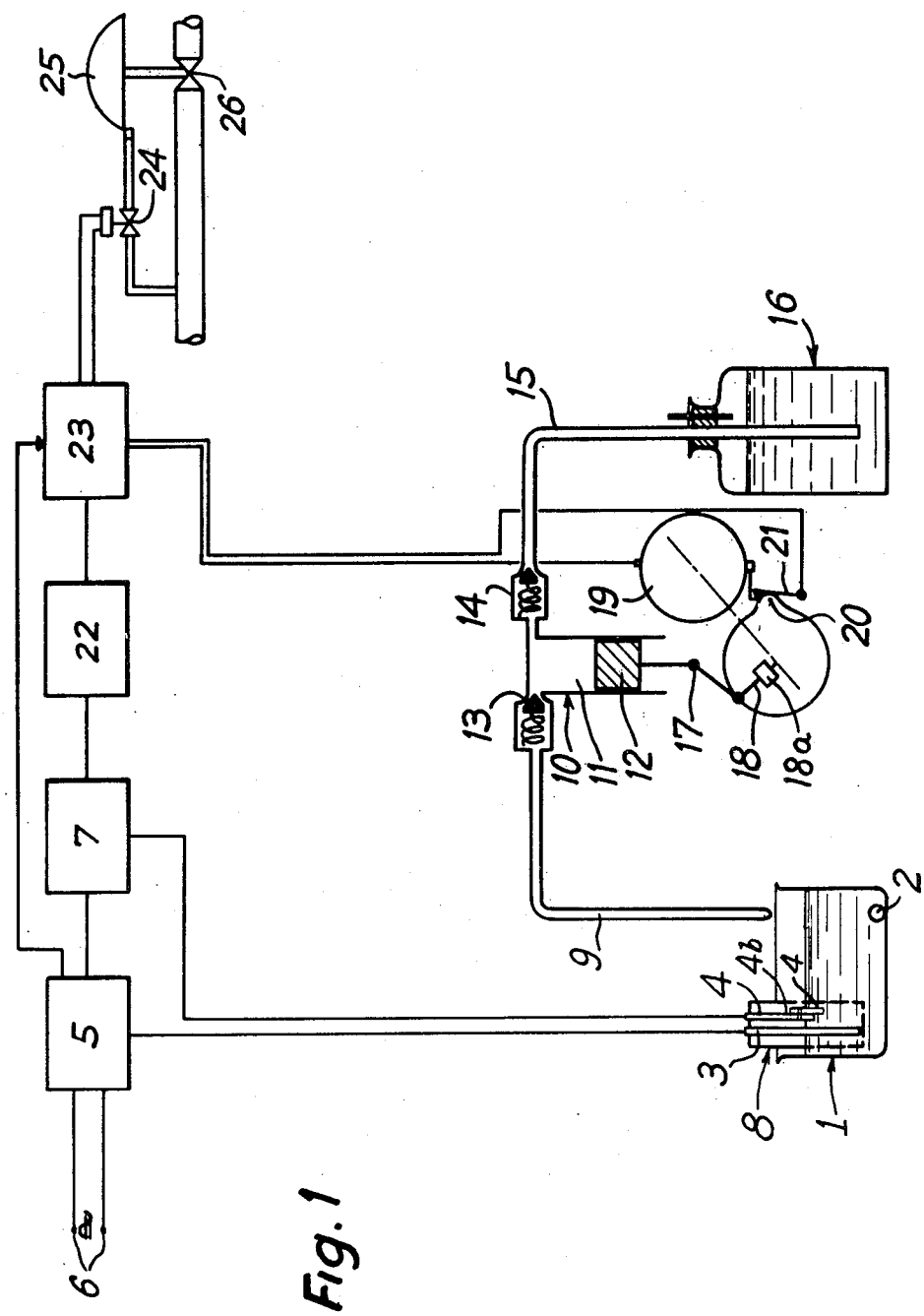

United States Patent [19]
Rutten

[11] 3,721,254
[45] March 20, 1973

[54] DEVICE FOR AUTOMATICALLY DRIVING AN IRRIGATION INSTALLATION

[75] Inventor: Pierre L. Rutten, Nimes, France

[73] Assignee: Compagnie Nationale D'Amenagmt de la Region du Bas-Rhode Languedoc, Nimes, France

[22] Filed: Feb. 3, 1971

[21] Appl. No.: 112,182

[30] Foreign Application Priority Data

Feb. 9, 1970    France..................................7004535

[52] U.S. Cl. ....................137/78, 137/624.15, 239/69
[51] Int. Cl. ..............................................A01g 25/00
[58] Field of Search......................239/63–70; 137/78, 137/624.13, 624.15, 624.16, 624.17

[56] References Cited

UNITED STATES PATENTS

| | | | |
|---|---|---|---|
| 2,965,117 | 12/1960 | Gallacher | 137/78 |
| 3,127,108 | 3/1964 | Harris | 137/78 X |
| 3,422,833 | 6/1969 | Kitrilakis | 137/78 |

Primary Examiner—Martin P. Schwadron
Assistant Examiner—Richard Gerard
Attorney—Bucknam and Archer

[57] ABSTRACT

This invention relates to a device for automatically controlling the manoeuvres of motorized obturators controlling the distribution of irrigation water, composed of a cyclic programmer, an evaporation tank which automatically controls the starting of the programmer and means, controlled by the programmer and independent of the obturators, for injecting a determined amount of water into the tank, during each cycle of the programmer.

7 Claims, 2 Drawing Figures

DEVICE FOR AUTOMATICALLY DRIVING AN IRRIGATION INSTALLATION

The present invention relates to a device for automatically driving an irrigation installation serving one or more plots of cultivated land.

One of the aims of the invention is to distribute to each plot a quantity of water that is proportional to the requirements of the cultivation as a function of the climatic conditions.

The expression rationed quantity signifies the ratio, between 0 and 1, between on the one hand the quantity of water actually evaporated by a cultivation and on the other hand the quantity of water which would be evaporated, under the same climatic conditions, by a cultivation of the same area entirely covering the ground and supplied with physically free water.

The quantity of water actually evaporated by a given cultivation during a fairly long period of time, is equal to the quantity of water in fact supplied to the plot by irrigation and by rainfall. Of course, in the case of a dry climate, rainfall hardly occurs.

Experience has shown that the results in quantity and quality of a cultivation may be very efficiently modified by adjusting the rationed quantity according to the nature of the cultivation and according to the stage of growth thereof.

One of the aims of the invention is a device enabling the quantity of water supplied by an irrigation network to various plots to be adjusted accurately and automatically so that the rationed quantity remains constant when the climatic conditions vary and enabling the rationed quantities to be adjusted as a function of the nature of the cultivation and the stage of growth thereof.

The irrigation installation controlled by the device according to the invention may be of any known type.

It comprises one or more main pipes constituted by a system of pipes under pressure or by a channel open to the atmosphere, on which branch lines are connected in shunt, each branch line supplying a cultivated plot. Each branch line comprises, in the beginning, electrically, hydraulically or pneumatically controlled motorized means enabling said line to be placed in communication with a main pipe when said means are open or to be isolated from the main pipe when they are closed. These means which are constituted for example by motorized valves are generally designated by the term obturators.

The device according to the invention enables the obturators to be opened and closed automatically and sequentially by means of a programmer. The quantity of water distributed to each plot is adjusted by modifying the opening time of each obturator in the course of each reference period. The length of the reference periods is equal to the time necessary for evaporating a determined quantity of water and varies automatically in a manner inversely proportional to the rate of evaporation measured by means of an evaporation tank.

Systems are already known for controlling irrigation installations as a function of the climatic conditions, which comprise a container open to the atmosphere, known as an evaporation tank, containing water which evaporates at a speed which depends upon the climatic conditions. In these known systems, water is derived from the irrigation network, downstream of one of the valves controlled by the tank. The quantity of water injected into the tank at the end of each irrigation cycle is proportional to the opening time of the valve downstream of which the water is derived.

This system presents several drawbacks:

the water which is sent into the evaporation tank is water derived from the irrigation network, which is often charged with impurities which lead to a poor functioning of the tank.

In order to reduce the length of the pipe which takes water to the evaporation tank, said latter must be implanted near the valve downstream of which the water is derived, thus near the cultivated plots.

As the quantity of water injected into the evaporation tank is proportional to the opening time of the valve downstream of which is derived the water injected into the tank, if it is desired to vary the coefficient of proportionality, in order to vary the frequency of the irrigations, gauged apertures must be used having a well-determined output, the functioning of which is not very compatible with the quality of the irrigation water.

A device according to the invention for automatically driving an irrigation installation comprising one or more main water distribution pipes and one or more branch lines, serving one or more cultivated plots, connected in shunt to the network by means of motorized obturators, is composed of a cyclic programmer for sequentially controlling the successive openings and closings of each of the obturators; of an evaporation tank open to the atmosphere, containing water which evaporates at a speed which depends upon the climatic conditions; of means for controlling the starting of the programmer when the level of the water in the tank reaches a reference level and of means for periodically injecting water into the tank.

The essential difference between this device and the known devices resides in the fact that a determined quantity of water, independent of the duration of opening of the obturators is injected into the tank in the course of each cycle of the programmer. The time necessary for this quantity of water to evaporate is called the reference period. The duration of this period varies as a function of the climatic conditions.

The amounts of water injected into the tank are preferably derived from a container which is supplied, independently of the irrigation network, with clean, filtered or distilled water, in order to avoid any functional difficulty due to the impurity of the water. The evaporation tank and the programmer may then be placed in a central control station from which the maneuvers of all the obturators located inside a perimeter are remotely controlled, said perimeter having an extent of perhaps several kilometers as the climatic conditions remain substantially the same over the whole of this area.

The amount of water injected may be regulated so as to vary the duration of the reference period and the frequency of the irrigations. For example, the means for injecting the water in the tank are constituted by an automatic pipette composed of a piston driven by an electric motor whose starting is controlled by the programmer. The stroke of the piston is adjustable, this enabling the volume of the pipette to be modified.

According to a characteristic of the invention, the programmer used in combination with the tank is of a type which enables the opening times of the obturators, which are displayed on the programmer, to be easily varied.

By periodically modifying the operational times of each obturator, the rationed quantities may thus be varied. Different durations of opening may also be displayed for the obturators equipping the same network and thus the rationed quantities may be regulated as a function of the requirements of the different cultivations and of their stage of growth.

By varying the amount of water injected, it has been seen that the frequency of the irrigation could be varied. If the opening durations of the valves are not varied in the course of each reference period, the rationed quantity varies in the same sense as the frequency. On the contrary, if the opening times displayed on the programmer are modified proportionally to the dose of water injected in the course of each cycle, the frequency of the irrigations is varied without modifying the rationed quantity.

This possibility, which in practice is important, does not exist in the known devices where the frequency of the irrigations is varied without being able to vary the opening durations of the obturators in the course of each reference period.

Devices exist which comprise a tank in which the rate of evaporation may be varied by modifying the surface of the opening of the tank. A device also exists which is equipped with a tank in which the quantity of water may be varied by modifying the height of the overflow pipe. These devices enable the duration of the reference period and the frequency of the irrigations to be modified but the rationed quantity varies at the same time as they do not comprise a programmer with adjustable duration of operation.

The device according to the invention comprises in addition means for adjusting the reference level of the water in the tank, i.e. the level which causes the programmer to start.

The quantity of water between the reference level and the bottom of the tank constitutes a reserve for unsatisfied water requirements, for example where the quantity of water evaporated in the tank, during a cycle of the programmer, is greater than the amount of water injected. This height is adjusted proportionally to the quantity of water necessary for reconstituting the reserves of water for the fraction of the ground used by the roots. For example, in the case of clay soils having a high water capacity, a high level may be chosen ; this height will on the contrary be low if the soil is sandy.

The device according to the invention comprises numerous adjustable parameters, viz : the surface of the evaporation tank, the quantity of water injected in the tank in the course of each cycle, the duration of opening of each obturator displayed on the programmer, the height of the reference level above the bottom of the tank.

The values selected for these various parameters enable an irrigation installation to be adapted to the following factors : the rate of evaporation ; the sought-after or tolerated rationed quantity ; the characteristics of the soil : permeability, water-retention capacity ; the nature of the cultivation ; the stage of growth thereof ; the output of water available on the main pipe ; the method of irrigation carried out and the output requirements that it involves.

A plurality of devices according to the invention may be grouped in a central control room from which all the obturators of the network are remotely controlled, this permitting a very rational organization of the operation of the network as a whole, an easy surveyance thereof and a breakdown-free operation.

The invention will be more readily understood with reference to the accompanying drawings, in which :

FIG. 1 schematically shows the device as a whole.

Figure 2:
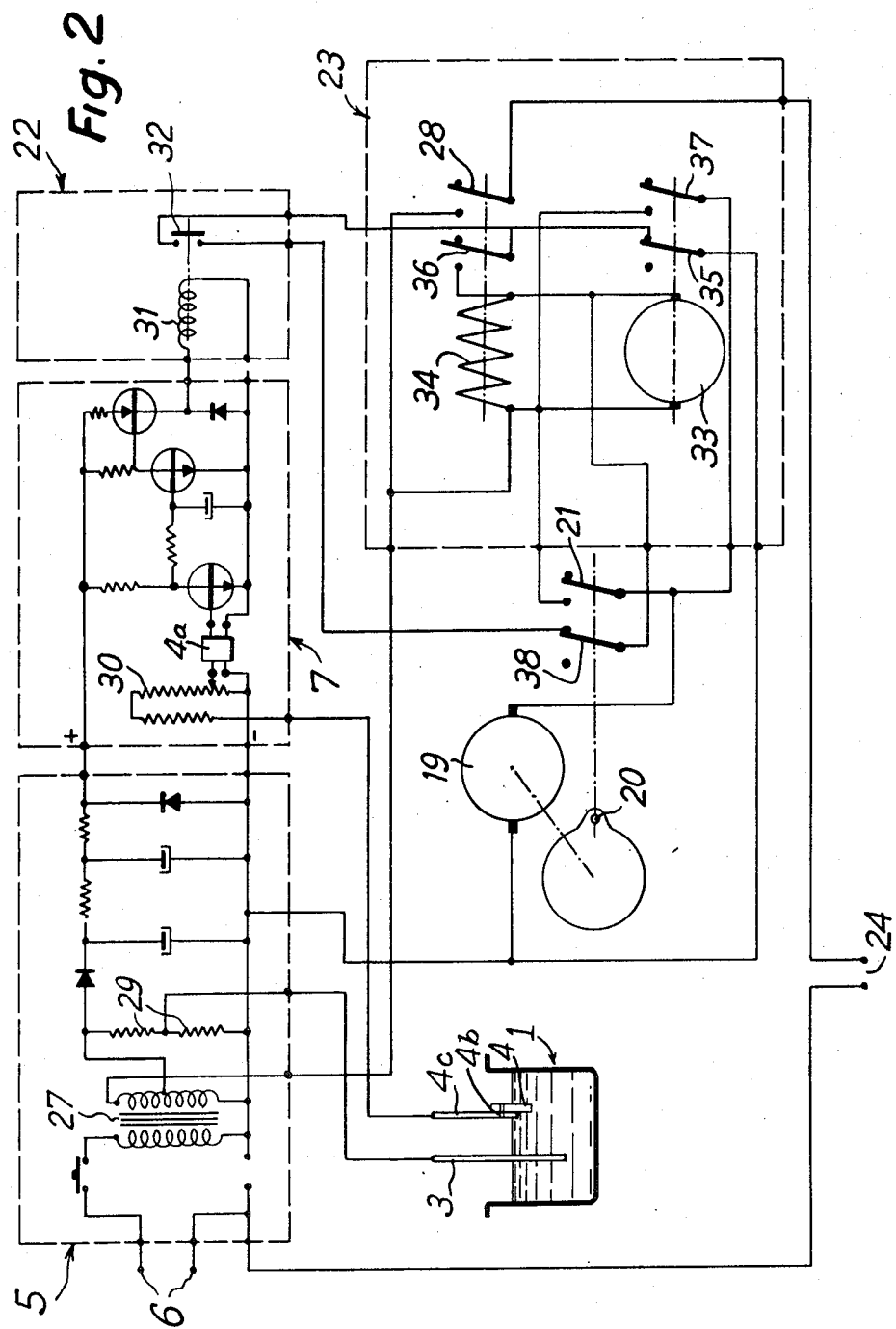

FIG. 2 is a block diagram of the electrical and electronic circuits of the device.

Referring now the drawings, 1 represents a container open to the atmosphere containing water, for example a glass crystallizer. This container is known here as an evaporation tank. A drop of mercury 2 is placed in the water of the tank in order to avoid the development of algae and micro-organisms which would modify the rate of evaporation.

The tank 1 is placed outside, in the shade. Two vertical electrode 3 and 4 are immersed in the tank. The electrode 3, which is longer, serves as feed electrode. It is connected to a voltage divider fed by the secondary winding of a transformer located in the feed circuits 5 connected to a voltage source 6. The shorter electrode 4 is the level detection electrode and its lower end serves as reference level said shorter electrode 4 being mounted on a holder 4b slidably connected to a fixed rod 4c so that the height of electrode 4 with respect to the base of tank 1 can be adjusted. It is connected to the input of an amplifier 7. The two electrodes 3 and 4 are placed in an enclosure 8, pierced with holes which serves as tranquillization chamber. The surface of the liquid inside the chamber remains undisturbed even if the surface of the liquid in the tank is agitated.

Tranquillization may also be obtained electronically by means 4a for filtering the current pulses which could be provoked by the agitation of the surface of the liquid in the tank.

Above the tank 1 is placed conduit 9 which serves as overflow for an automatic pipette 10 of any known type. For example, the pipette 10 is composed of a cylinder 11 in which a piston 12 moves. The cylinder 11 communicates on the one hand, via a suction valve 14, with a pipe 15 which plunges into a container 16 containing filtered water and, on the other hand, via the delivery valve 13, with the overflow conduit 9. This assembly constitutes a gauge pump with piston.

The piston 12 is driven in a reciprocal movement by a rod 17 and a crank 18 rotated by a small rotor 19. A cam 20, integral with the crank 18, acts on a switch 21, placed in series in an auto-feed circuit of the motor and automatically stops said latter when the crank 18 has made a complete revolution and when the pipette 10 has emptied into the tank 1. The quantity of water which is injected into the tank depends upon the stroke of the piston 12 which is adjustable by acting on the length of the crank 18 as for example by making it of two separate sections end-threaded to screw into a similarly threaded coupling sleeve 18a or by any other equivalent means.

FIG. 1 schematically shows the electrical and electronic circuits and a more detailed representation thereof is shown in FIG. 2.

The terminals 6 are connected to a source of A.C. voltage. 5 represents the feed circuits and 7 an amplifier. 22 represents an electromagnetic relay whose contact is closed when the electrode 4 is out of the water and open when said electrode is immersed in the water. 23 represents a programmer whose starting is controlled by the closing of the contact of the relay 22. This programmer controls the opening and closing, at the end of an adjustable length of time, of an electrovalve 24 placed on a circuit for feeding water to the control membrane 25 of a hydraulic valve 26. The valve 26 controls the distribution of the water in an irrigating branch line. The programmer 23 also controls the starting of the motor 19. The programmer also comprises a contact, inserted in an auto-freed circuit, which controls the stopping of the programmer. The programmer 23 is constituted for example by a time-switch comprising a dial on which the opening time of the valve 24 is displayed.

The tank 1 determines the time which separates the successive openings of the valve 26, this time being known as reference period. The duration of the reference period is equal to the duration of evaporation of the quantity of water injected through the pipette 10 in the tank 1. This duration is longer as the rate of evaporation is more reduced. By varying the stroke of the piston 12, the duration of the reference period is varied in the same sense and, in the reverse sense, the rationed quantity is varied.

The installation may comprise a plurality of valves 26, placed on branch lines connected to the same main pipe. In this case, the electrovalves 24, corresponding to the various valves 26, are opened and closed sequentially by the programmer 23. This latter is constituted, for example, by a series of time-switches mounted in cascade so that the stopping of one time-switch corresponds to the starting of the following.

FIG. 2 represents an electric and electronic block diagram of the device.

This FIG. 1 shows the tank 1 and the two electrodes 3 and 4 the electrode 4 being mounted on a holder 4b sliding on the fixed rod 4c; the motor 19 for driving the pipette ; the cam 20 and the switch 21 actuated by this cam ; the terminals 6 for connection to the voltage source and the terminals 24 of the electro-magnet which equips the electrovalve placed on the circuit feeding water to the membrane of a hydraulically controlled valve. FIG. 2 shows the case of a control of a single valve. This Figure shows in detail the circuits corresponding to rectangles 5, 7, 22 and 23 of FIG. 1 which are shown in broken lines.

The circuits 5 or feed circuits comprise a transformer 27. The voltage at the terminals of the secondary winding is sent to the electrovalve 24, by means of the contact 28. A rectifier and filters, forming part of the feed circuits 5, feed the amplifier 7 with D.C. voltage.

The voltage divider 29 sends a voltage to the electrode 3. Part of the resultant voltage, picked up on the electrode 4 when said latter is immersed in the water of the tank, is sent to the input of the amplifier 7, by the voltage divider 30 through the filter means 4a which is a high-pass filter and can be composed of a capacitor and/or any other suitable electric network components well known in the art. The absence of voltage controls the closure of the contact 32 of the relay 22 whose coil 31 is fed by the output voltage of the amplifier 7. The closure of the contact 32 controls the starting of the programmer 23. This latter comprises a time-switch driven by the synchronous motor 33. The motor 33 and the coil 34 are mounted in parallel and fed through the contacts 35 and 38 which are closed. The energization of the coil 34 brings about the closure of the contacts 36 and 28. The closure of contact 28 brings about the opening of the electrovalve 24 which controls the beginning of an irrigation cycle. The contact 36 is an auto-feed contact of the coil 34 and the motor 33.

At the end of the time displayed on the dial of the time-switch, cams close the contact 37 and, a short time afterwards, open the contact 35. In the case shown of a single valve, the closure of the contact 37 feeds the motor 19 which drives the pipette and the cam 20. The contacts 21 and 38 trigger until the cam 20 has made a complete revolution. The opening of the contact 35 brings about the stopping of the time-switch and the closure of the electrovalve 24. The time-switch is re-set for a new cycle. The contact 38 remains open during a complete revolution of the cam 20 and prevents any triggering of a new irrigation cycle as long as the automatic pipette has not finished its movement.

Where the installation comprises a plurality of valves, it comprises a plurality of identical time-switches mounted in cascade. In this case, the closure of the contact 37 of one time-switch controls the starting of the following time-switch. The last time-switch comprises a contact 37 whose closure, at the end of a cycle, controls the starting of the motor 19. Of course, the durations of opening of the different valves displayed on the dials of the time-switches may be different so that the rationed quantities may vary according to the cultivations.

Where all the branch lines irrigate portions of the same cultivation, and where the opening times of all the valves are the same, a single time-switch may be used which enables the opening time, associated with a step-by-step relay, which ensures the successive controls of all the valves, to be displayed.

If the evaporation in the tank, during an irrigation cycle was more than the quantity of water injected through the pipette, the level of the water in the tank does not reach the electrode 4. In this case, the contact 32 remains closed and a new irrigation cycle recommences.

What is claimed is :

1. A device for automatically controlling flow in an irrigation installation having at least one main water distribution pipe to which at least one branch line is connected in shunt through a motorized obturator, which device comprises a cyclic programmer for sequentially controlling the operation of said obturator; an evaporation tank open to the atmosphere and containing water for evaporation at a speed according to ambient climatic conditions, said programmer being remote from the irrigation installation; means responsive to the level of the water in said tank and operable to automatically control the starting of the programmer when the level of the water in the tank reaches a reference level; and means for injecting a predetermined amount of water into said tank during the course of each cycle of the programmer, said injecting means being controlled by the programmer and independent of said obturator.

2. A device according to claim 1, wherein the means for controlling the automatic starting of the programmer are constituted by two electrodes immersed in the tank, between which a low intensity current circulates as long as the two electrodes are immersed in the water of the tank, which electrodes are placed inside an enclosure pierced with holes which constitutes a tranquillization chamber.

3. A device according to claim 1, wherein the means for controlling the automatic starting of the programmer are constituted by two electrodes immersed in the tank, between which a low intensity current circulates as long as the two electrodes are immersed in the water of the tank, comprising electronic filtering means for eliminating the current pulses which would be caused by the agitation of the surface of the liquid contained in the tank.

4. A device according to claim 1 wherein said injection means includes an automatic pipette controlled by said programmer and operable to inject a predetermined amount of water into said tank, said automatic pipette having means to adjustably set said predetermined amount of water injected and being independent of said obturator.

5. A device according to claim 4, wherein the automatic pipette is constituted by a piston driven inside a cylinder by a small electric motor which also drives a cam which controls the automatic stopping of said motor at the end of a revolution.

6. A device according to claim 1 wherein said programmer includes means for programming a selected opening time duration for said obturator to correspondingly adjust the quantity of water delivered through said distribution pipe.

7. A device according to claim 1 wherein the means responsive to the water level in the tank includes two electrodes, one of which can be adjustably positioned with respect to the base of the tank.

* * * * *